(12) United States Patent
Tribolet et al.

(10) Patent No.: US 10,708,332 B2
(45) Date of Patent: *Jul. 7, 2020

(54) METHOD AND APPARATUS FOR VIEWING AND FILTERING MEDIA CONTENT

(71) Applicant: YipTV, Inc., West Palm Beach, FL (US)

(72) Inventors: Michael Tribolet, Riviera Beach, FL (US); Tomasz Sarnowski, Perth Amboy, NJ (US); Louis Holder, Prince Junction, NJ (US)

(73) Assignee: YIPTV, INC., West Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,553

(22) Filed: Jul. 16, 2018

(65) Prior Publication Data

US 2018/0324236 A1  Nov. 8, 2018

Related U.S. Application Data

(63) Continuation of application No. 15/263,325, filed on Sep. 12, 2016, now Pat. No. 10,027,733.

(Continued)

(51) Int. Cl.
*H04L 29/06* (2006.01)
*H04L 29/08* (2006.01)
*H04L 12/825* (2013.01)

(52) U.S. Cl.
CPC ............ *H04L 65/602* (2013.01); *H04L 47/25* (2013.01); *H04L 65/4084* (2013.01);
(Continued)

(58) Field of Classification Search
None
See application file for complete search history.

(56) References Cited

U.S. PATENT DOCUMENTS 9,680,685 B2  6/2017 Eshov et al.
2005/0005025 A1  1/2005 Harville et al.
(Continued)

OTHER PUBLICATIONS

International Search Report and Written Opinion dated Nov. 17, 2016, issued in corresponding PCT Application No. PCT/US2016/051385. No copy provided, per MPEP 609. Submitted in parent U.S. Appl. No. 15/263,325.

(Continued)

*Primary Examiner* — Davoud A Zand
(74) *Attorney, Agent, or Firm* — Squire Patton Boggs (US) LLP

(57) ABSTRACT

Embodiments of the present invention relate to viewing and filtering media content. In one embodiment, the invention is a system for networking based redirecting of content, including but not limited to, media files, electronic documents, application data, on-demand data, and live-streamed data. The system includes at least one content delivery network (CDN) comprising a processor, memory to store data used by a processor, where the system includes more than one encoder server capable of sending more than one bit rate for a channel to an anchor server, where the anchor server determines which ingestion server to send content to, and where the channel content bit rate sent to a user device is dependent upon the user device internet bandwidth.

18 Claims, 19 Drawing Sheets

Related U.S. Application Data

(60) Provisional application No. 62/217,620, filed on Sep. 11, 2015.

(52) U.S. Cl.
CPC ............. *H04L 67/02* (2013.01); *H04L 67/10* (2013.01); *H04L 67/101* (2013.01); *H04L 67/1097* (2013.01); *H04L 67/14* (2013.01)

(56) References Cited

U.S. PATENT DOCUMENTS

| | | |
|---|---|---|
| 2011/0197237 A1 | 8/2011 | Turner |
| 2011/0296048 A1 | 12/2011 | Knox et al. |
| 2012/0023530 A1 | 1/2012 | Xia |
| 2012/0114302 A1* | 5/2012 | Randall ................ G11B 27/105 386/241 |
| 2012/0317197 A1 | 12/2012 | De Foy et al. |
| 2013/0031211 A1 | 1/2013 | Johnson et al. |
| 2013/0246643 A1* | 9/2013 | Luby ................ H04N 21/23439 709/231 |
| 2014/0019593 A1* | 1/2014 | Reznik .................... H04L 65/60 709/219 |
| 2014/0108671 A1 | 4/2014 | Watson et al. |
| 2015/0085654 A1 | 3/2015 | Xiong |
| 2015/0326868 A1 | 11/2015 | Ezhov et al. |
| 2016/0044080 A1* | 2/2016 | DuBreuil ........... H04N 21/8456 709/219 |
| 2016/0307596 A1* | 10/2016 | Hardin ............... H04N 21/8549 |

OTHER PUBLICATIONS

International Preliminary Report on Patentability dated Mar. 13, 2018, issued in corresponding PCT Application No. PCT/US2016/051385. Submitted in parent U.S. Appl. No. 15/263,325.

* cited by examiner

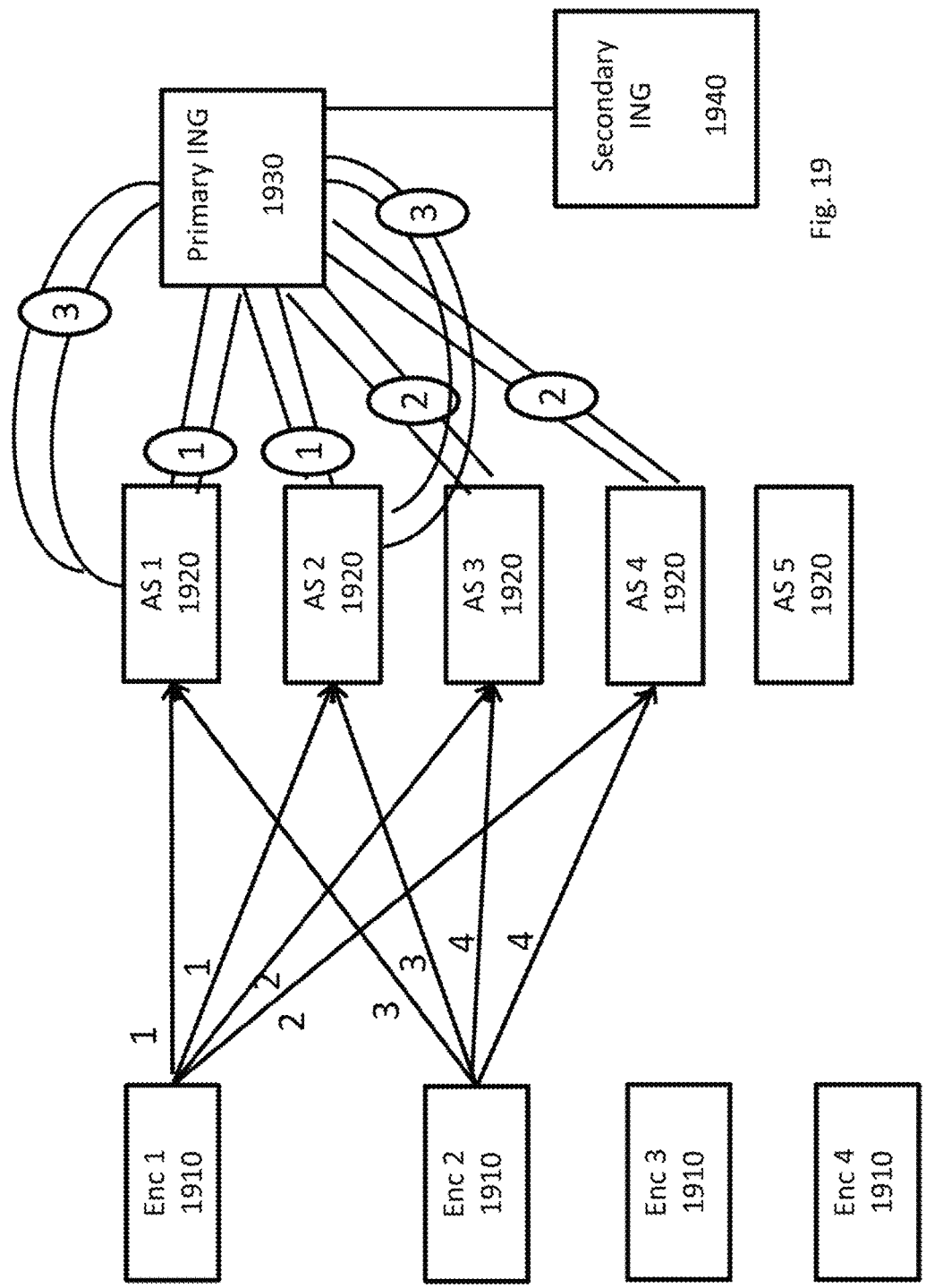

METHOD AND APPARATUS FOR VIEWING AND FILTERING MEDIA CONTENT

CROSS-REFERENCE TO RELATED APPLICATION

This Application is a Continuation of co-pending U.S. patent application Ser. No. 15/263,325, filed on Sep. 12, 2016, which claims priority from U.S. Provisional Patent Application No. 62/217,620, filed on Sep. 11, 2015. The entire disclosures of these earlier applications are hereby incorporated herein by reference.

BACKGROUND

Embodiments of the present invention relate to viewing and filtering media content.

Content delivery networks may provide content to end-users via an internet content delivery network (CDN). A CDN is a network of geographically distributed system of servers that arrange for efficient delivery of content on behalf of third party content providers. The provided content may include, but is not limited to, media files, electronic documents, application data, on-demand data, and live-streamed data, for example.

BRIEF DESCRIPTION OF THE DRAWINGS

For proper understanding of the invention, reference should be made to the accompanying drawings, wherein:

FIG. 19 illustrates a system for addressing CDN balancing in accordance with certain embodiments of the invention.

DETAILED DESCRIPTION

Figure 1:
FIG. 1 illustrates an interface that allows users to filter content in accordance with different categories and sub-categories, in accordance with certain embodiments.

This invention discloses several embodiments for viewing and filtering media content. This description uses terms such as "one embodiment" or "an embodiment" to mean that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

For purposes of understanding the invention, it should be understood that terms "component," "module," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Further, it should be understood that various embodiments of systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

In addition, the embodiments of systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

Certain embodiments of the present invention relate to implementing a system for viewing and filtering media content. The content may be delivered via different media channels. A media channel may generally refer to physical or logical connection that is used to transmit a signal. The transmitted signal may be in the form of a digital or analog stream, for example. Different channels may transmit different types of content. With the introduction of a large number of different channels that are viewable by a user, the user may wish to filter the different channels in accordance with certain criteria that is specified by the user. By filtering the different channels, a user may more readily determine channels that are relevant to the user's interests, for example.

In view of the above, certain embodiments of the present invention may be directed to providing functionality that allows a user to perform channel filtering. FIG. 1 illustrates an interface that allows users to filter data in accordance with different categories and sub-categories. Referring to FIG. 1, a user can choose multiple sub-categories (such as, for example, "Sports," "Kids," "General," "News," "Music," etc.) within an overall category (such as, for example, "Genre") in order to obtain the most relevant results. Referring to the example of FIG. 1, other categories for filtering include "Language," "Region," and "Audience." For example, a user may decide to filter a plurality of channels by seeking channels that are related to either sub-category "Sports" 110 or "Music" 120. The user may also further filter the plurality of channels by the "Language" category 150. For example, the user may seek channels that are viewable in different languages such as "Spanish" and "Portuguese," for example. The user may further filter the plurality of channels by using a "Region" category 160. By using the Region category 160, the user may seek channels that originate from a continent, such as Europe or Africa, or a specific country, such as Mexico, Spain, and/or Brazil, for example. Other categories may be ratings (R, PG, G, NR) or user ratings on likeability (5 stars, 4 stars, 3 stars, etc.).

As described in more detail below, the plurality of channels may be filtered in accordance with the logical framework of categories and criteria. The filtered results may be channels that meet the following logical condition: (Category 1 [Sub Category 1 OR Sub Category 2 OR Sub Category 3 . . . ]) AND (Category 2 [Sub Category 2 OR Sub Category 2 OR Sub Category 3 . . . ]) AND (Category 3 [Sub Category 1 OR Sub Category 2 OR Sub Category 3 . . . ]) AND . . . .

For example, referring to the example of FIG. 1, suppose the user selects sub-categories "Sports" 110 and "Music" 120, within Category "Genre." Suppose the user also selects sub-category "English" within Category "Language." Suppose the user also selects sub-category "All" and "Children" within Category "Audience." In this example, the filtered channels may comprise channels that meet the following logical condition: (["Sports" OR "Music"] AND ["English"] AND ["All" OR "Children"]).

In addition, the user interface of FIG. 1 may also have an area for suggested results. If the user selects, for example, 3 filters for the channel or show category, then the software may suggest channels or shows using less categories, such has 2 of the 3 selected categories.

In view of the above, a user may perform in-depth filtering of media channels. Certain embodiments may provide an intuitive interface, such as the interface of FIG. 1, that allows a user to filter media channels in accordance with a combination of criteria (such as categories and sub-categories), such that the filtered results may more accurately reflect the user's interests.

Figure 2:
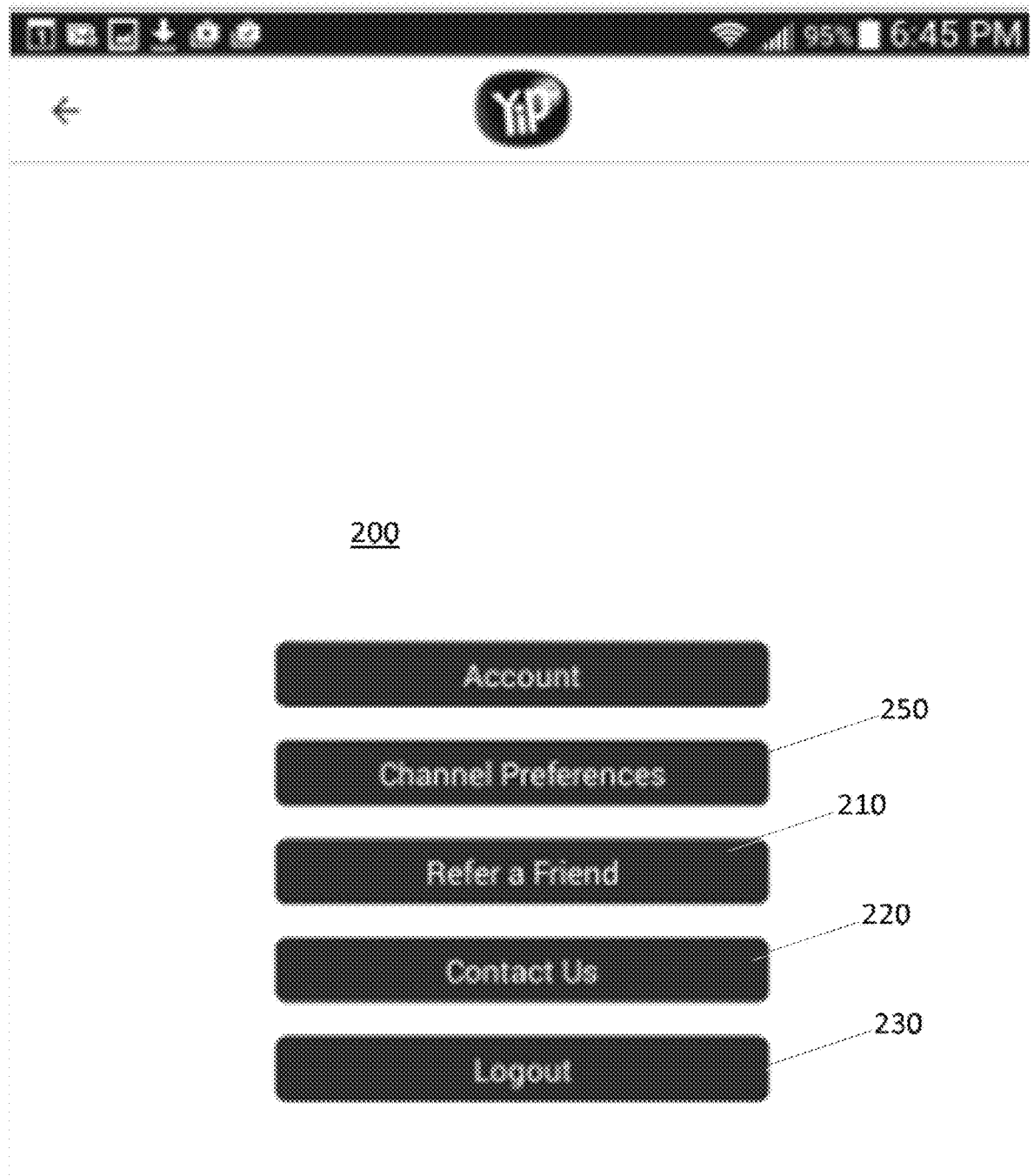
FIG. 2 illustrates an interface that enables a user to access various functionality, in accordance with certain embodiments.

FIG. 2 illustrates an interface 200 that enables a user to access various functionality, in accordance with certain embodiments. The functionality may allow a user to refer the application/service to a friend ("Refer a Friend" 210), contact an administrator ("Contact Us" 220), and/or log out of the application/service ("Logout" 230), for example. By clicking button "Channel Preferences" 250, a user may begin to filter channels as shown by FIG. 1. "Channel Preferences" 250 may also allow a user to choose the user's favorite channels to save within the user's account, as described in more detail below. The preferred channels of the user may then be displayed in an interface for the user, as described in more detail below.

Figure 3:
FIG. 3 illustrates an interface that displays a plurality of channels to filter through, in accordance with certain embodiments.

In general, as described above, the user may filter desired channels out of a larger plurality of channels. FIG. 3 illustrates an interface 300 that displays a plurality of channels to filter through, in accordance with certain embodiments. One can also have filtered results where the results are not a logo, but a live video. For instance, the user interface may contain the result of 9 channels, where the screen is divided into boxes, and shows live content from each of the 9 channels.

In addition, in one embodiment, a user may select a specific channel or show and forward a link to another user via text, SMS, email, facebook messenger, or the like. A user may also select a specific channel or show and forward a link containing a token to a non-user, where the user then is given a short time to view the channel or show.

Figure 4:
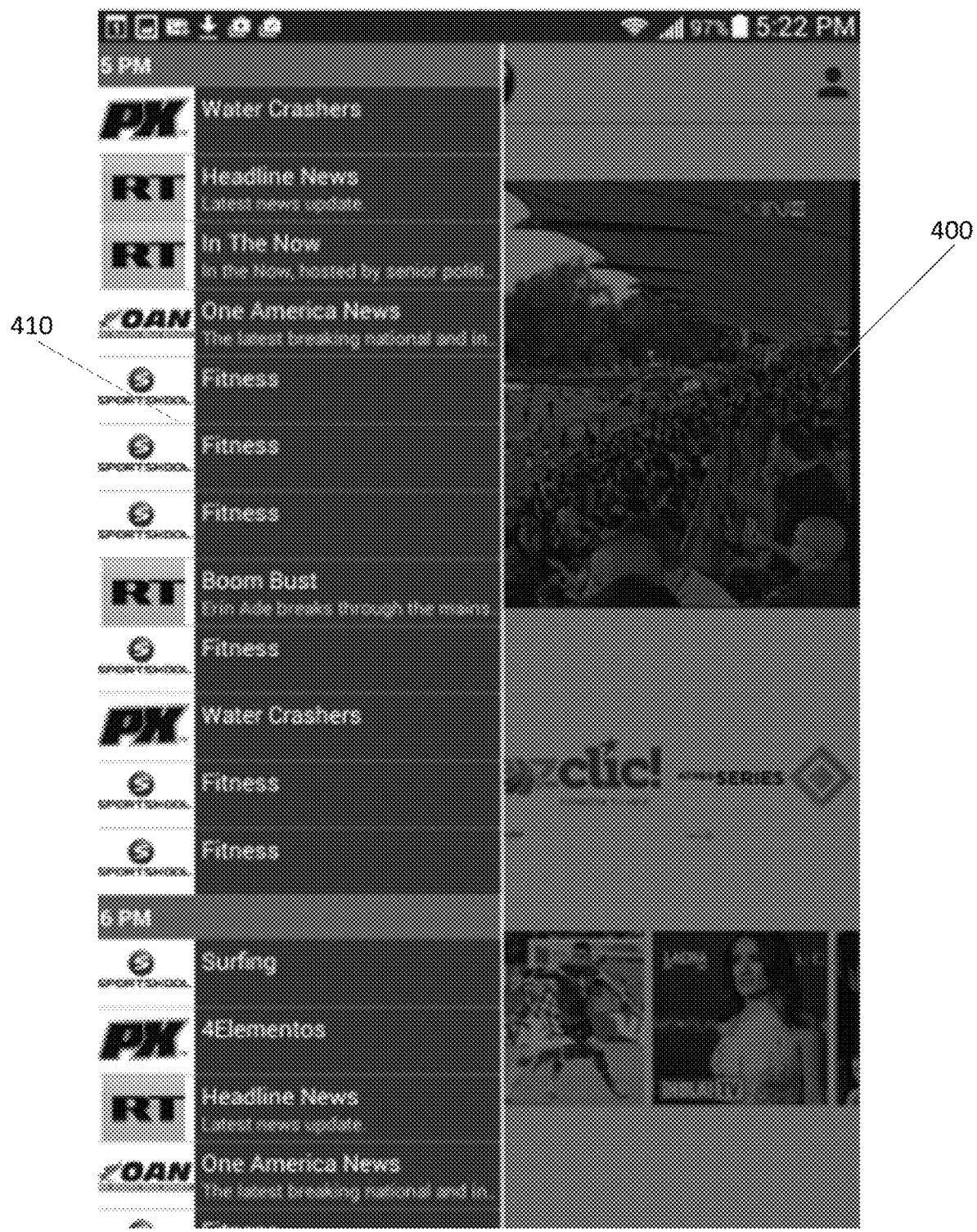
FIG. 4 illustrates an interface that includes a channel guide, in accordance with certain embodiments.

FIG. 4 illustrates an interface 400 that includes a channel guide 410, in accordance with certain embodiments. Channel guide 410 lists a plurality of channels, and channel guide 410 may list the programming for each channel at various times (e.g., at 5 PM and at 6 PM). With certain embodiments, channels can be selected directly from the channel guide 410 (left panel) to be viewed by the user.

Figure 5:
FIG. 5 illustrates an interface that allows a user to view content via a viewing window, in accordance with certain embodiments.

FIG. 5 illustrates an interface 500 that allows a user to view content via a viewing window 510, in accordance with certain embodiments. A user may view the various content from each of the various channels in a viewing portion/window 510. Interface 500 also may include a listing of channels 520 that the user may access. Interface 500 may also include a "filter" icon 530, which allows the user to filter channels, as illustrated by the functionality enabled by FIG. 1, as described above.

Figure 6:
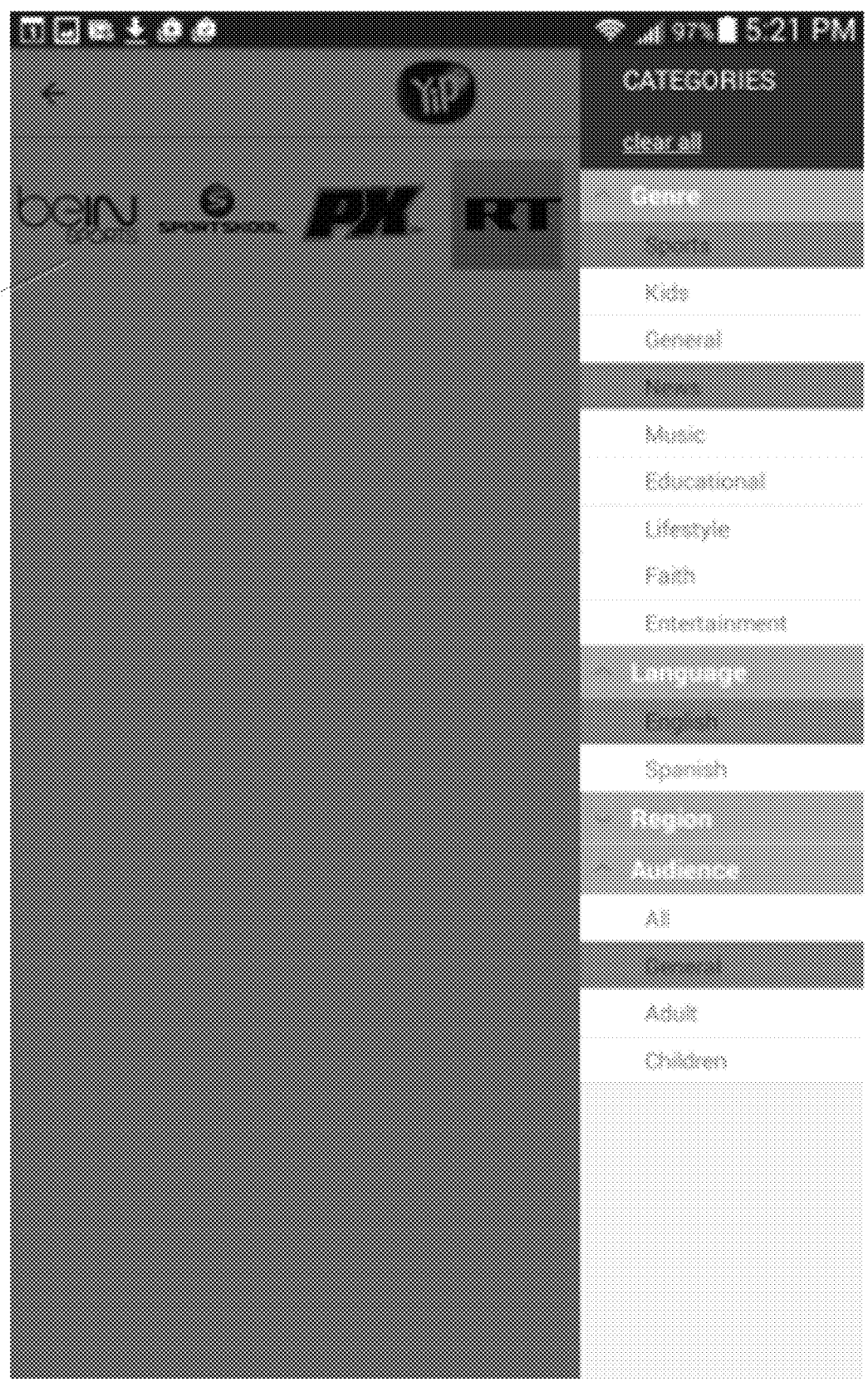
FIG. 6 illustrates filtered results, in accordance with certain embodiments.

FIG. 6 illustrates filtered results, in accordance with certain embodiments. As described with respect to FIG. 1, a user may select various categories/sub-categories to filter through a plurality of channels. FIG. 6 illustrates a plurality of filter results 650. These filter results 650 were yielded after a variety of categories/sub-categories were applied, as described above. With certain embodiments, channels can be selected and viewed directly from the filter-results screen.

Figure 7:
FIG. 7 illustrates an interface that reflects certain customized channel preferences, in accordance with certain embodiments.

FIG. 7 illustrates an interface 700 that reflects certain customized channel preferences, in accordance with certain embodiments. Specifically, interface 700 may display a customized group 750 of channels in accordance with specified channel preferences. The customized group 750 of channels may be stored within the user account of the user, in order to enable easy viewing of the stored channels by the user, across multiple devices. The customized list 750 of channels may also be considered to be a customizable "favorites" panel, where a user may save a number of favorite channels for easier access.

Figure 8:
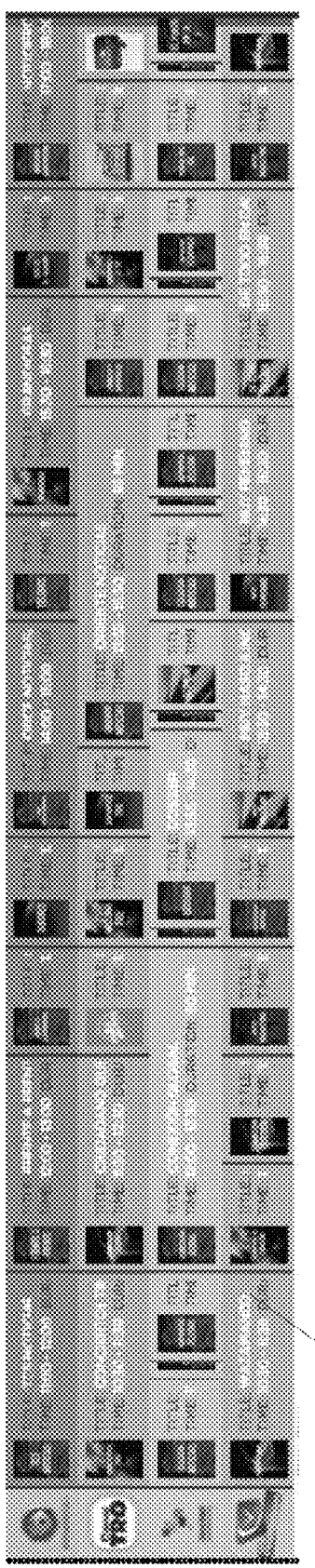
FIG. 8 illustrates a channel banner that may be included in certain interfaces of embodiments of the present invention.

FIG. 8 illustrates a channel banner 810 that may be included in certain interfaces of embodiments of the present invention. The channel banner 810 may display the content of a variety of different channels, and the different times that the content is shown for each channel.

Certain embodiments may also provide a customizable interface that reports different statistics/measurements relating to the user's viewing experience. The different statistics/measurements that are reported may include, for example, the utilized bandwidth, the utilized resources, and/or any other usage reporting and statistics related to a user's viewing session.

Certain embodiments may be directed to customizable sub-accounts that may be granted to others who are associated with a user. For, example a user may customize a sub-account for the user's family members, friends, or other acquaintances. The created sub-accounts can include customized functionality and/or preferences that are different than the functionality/preferences of the main account of the user.

Additionally, certain embodiments may implement dynamic session management via a registration of devices, regardless of the type of device, as described in more detail below. The registration of different devices, regardless of the type of device, may generally be referred to as "agnostic registration. "FIG. 9 illustrates a flow diagram of performing dynamic session management, in accordance with certain embodiments of the present invention.

Figure 9:
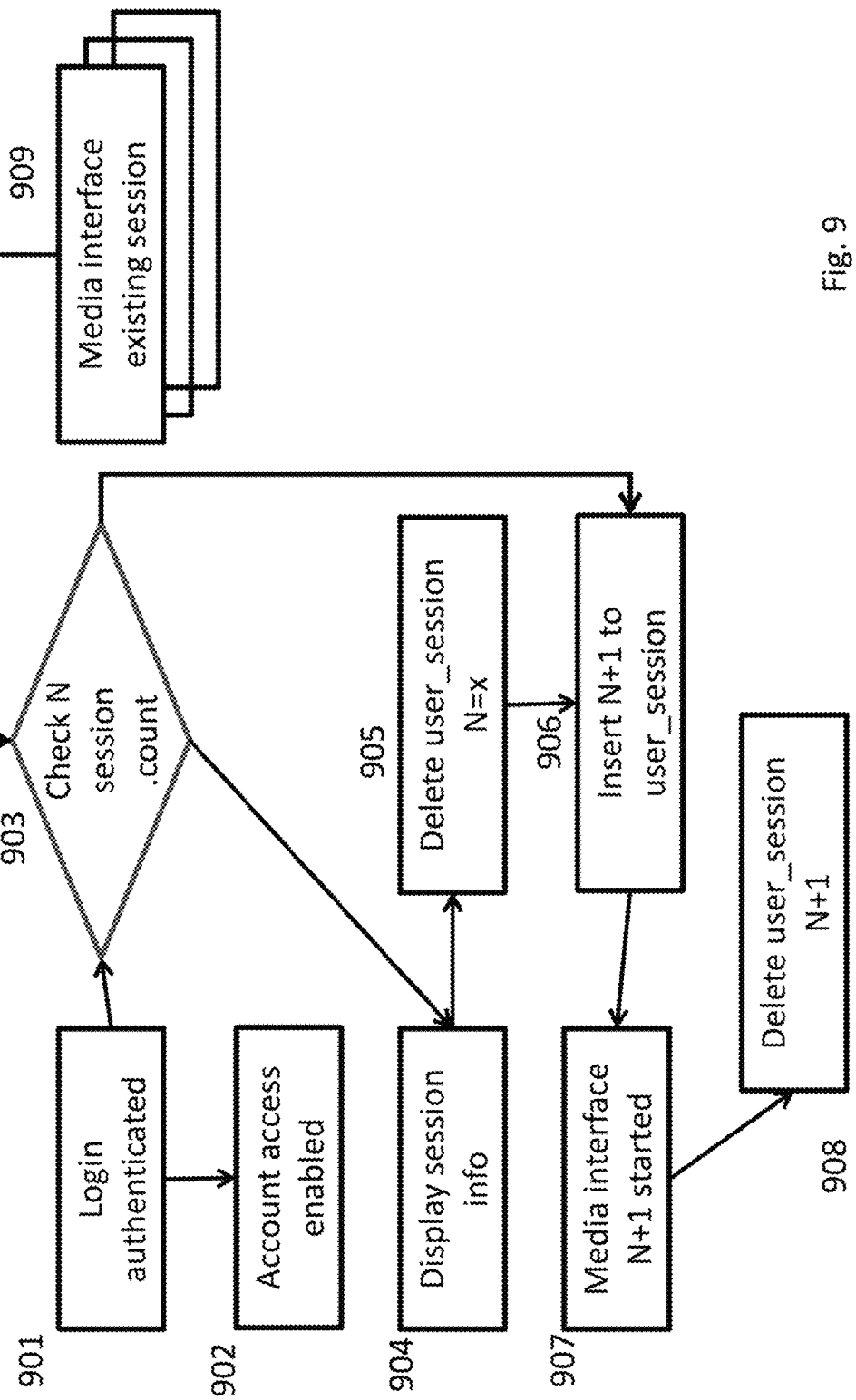
FIG. 9 illustrates a flow diagram for performing dynamic session management, in accordance with certain embodiments of the present invention.

Referring to FIG. 9, the dynamic session management may be configured to limit the number of active sessions that are using the service to a maximum of $N_{MAX}$ sessions, at any given time. In other words, for a given user account, at a given time, a user may only have $N_{MAX}$ active sessions across the different devices of the user (e.g., a computer of the user, a television of the user, a tablet of the user, a mobile phone of the user, etc.). As such, a processor is operative to receive and authenticate the user's login information for the creation of a new session, certain embodiments of the present invention will check how many active sessions there currently are. In the example of FIG. 9, there may be "N" active sessions. Therefore, certain embodiments of the present invention will compare the "N" active sessions to determine whether or not the "N" active sessions has exceeded the maximum $N_{MAX}$ number of sessions.

As illustrated in FIG. 9, when a login is initiated by a user, a processor is operative to instruct the user to enter authentication information which is unique to the user (email, phone number, password, and the like) and the processor is operative to compare the login information to the user account to authenticate the user 901. If the login information is correct, then the processor is operative to allow the user to obtain access to their account 902. The processor software program then checks the number of active sessions associated with the user account 903. If the number of active sessions ("N") has exceeded $N_{MAX}$, then certain embodiments will display a list of the active sessions to the user 904. The list of active sessions may include the list of devices current logged into the user account. The user may then delete a previously active session in order to activate a new active session 905. Alternatively, in one embodiment, a previously active session is automatically closed, where the automatically closed session may be the oldest (first logged in) session, or may be randomly selected. A new user session (representing the current new session) is then initiated 906 and added to the "N" active session information, and a new media interface is initiated 907. If the number of active sessions ("N") is less than Nom, then N+1 is inserted in the user_session 906, and a new media interface is initiated 907. When the user has finished accessing the account and a media interface has been closed, i.e., the user has logged out, the user_session N+1 is deleted from the queue of media interface existing sessions 909. The software logic of FIG. 9 is active or stateful, meaning that this process is iterative.

Certain embodiments of the present invention may be directed to implementing features on back-end systems.

Figure 10:
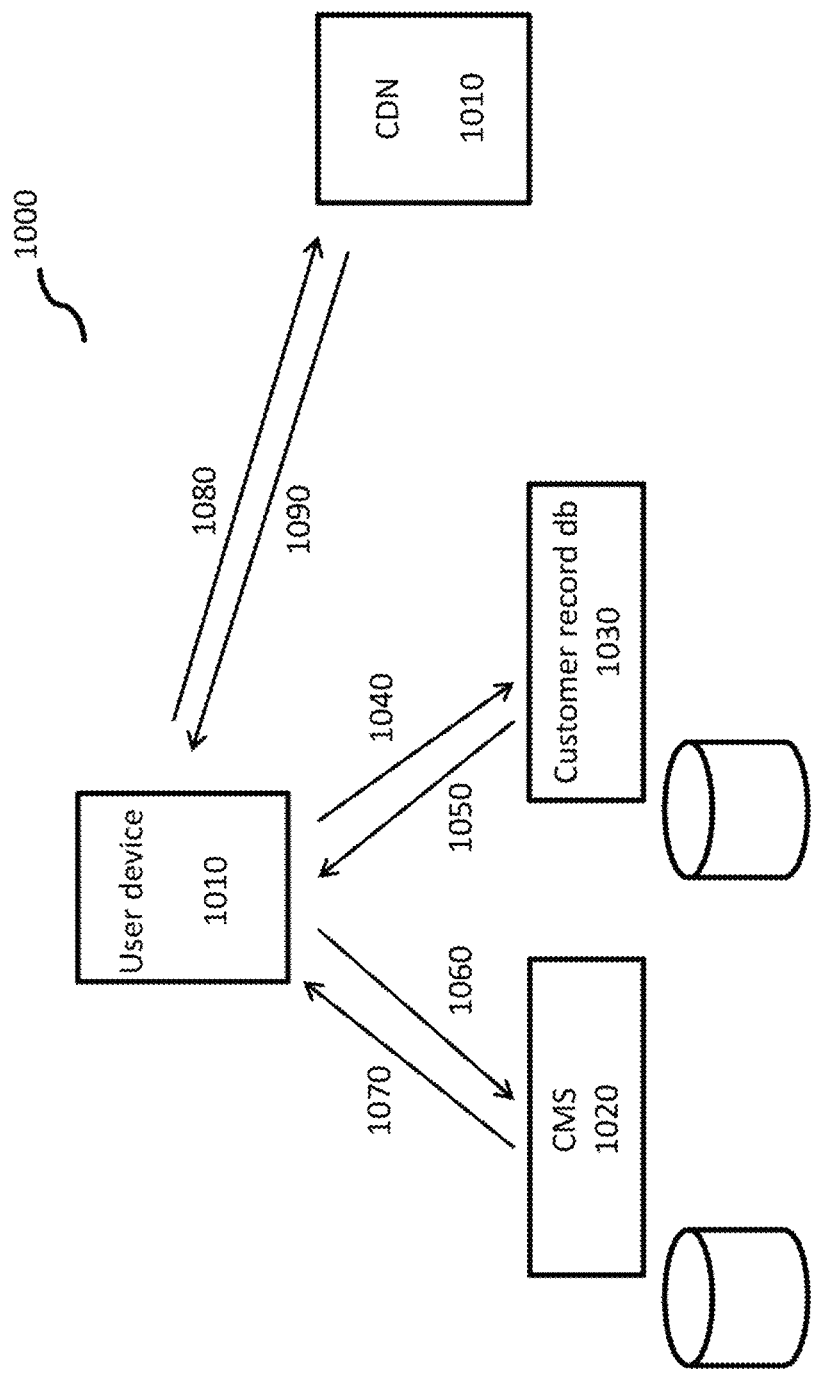
FIG. 10 illustrates a system including a content management system, in accordance with certain embodiments of the present invention.

FIG. 10 illustrates a system 1000 including a content management system 1020 and a customer record database 1030, in accordance with certain embodiments of the present invention. The system 1000 may be used by various user devices 1010, for example. The user device 1010 may be mobile computing devices such as, for example, Android™ devices and/or Apple™ devices. Communication flows 1040-1090 occur between the system 1000 and each of user devices 1010. For clarity, user device 1010 may engage in all communication flows 1040-1090 with the system 1000. System 1000 may include a content management system (CMS) 1020 and/or a customer record database 1030. CMS 1020 may store content such as, for example, the channels of different packages. Further, CMS 1020 may store content such as images for displaying the channels on the user interfaces, lineups for different channels, advertisements, and/or Uniform Resource Locator (URLs) for each of the channels.

Figure 11:
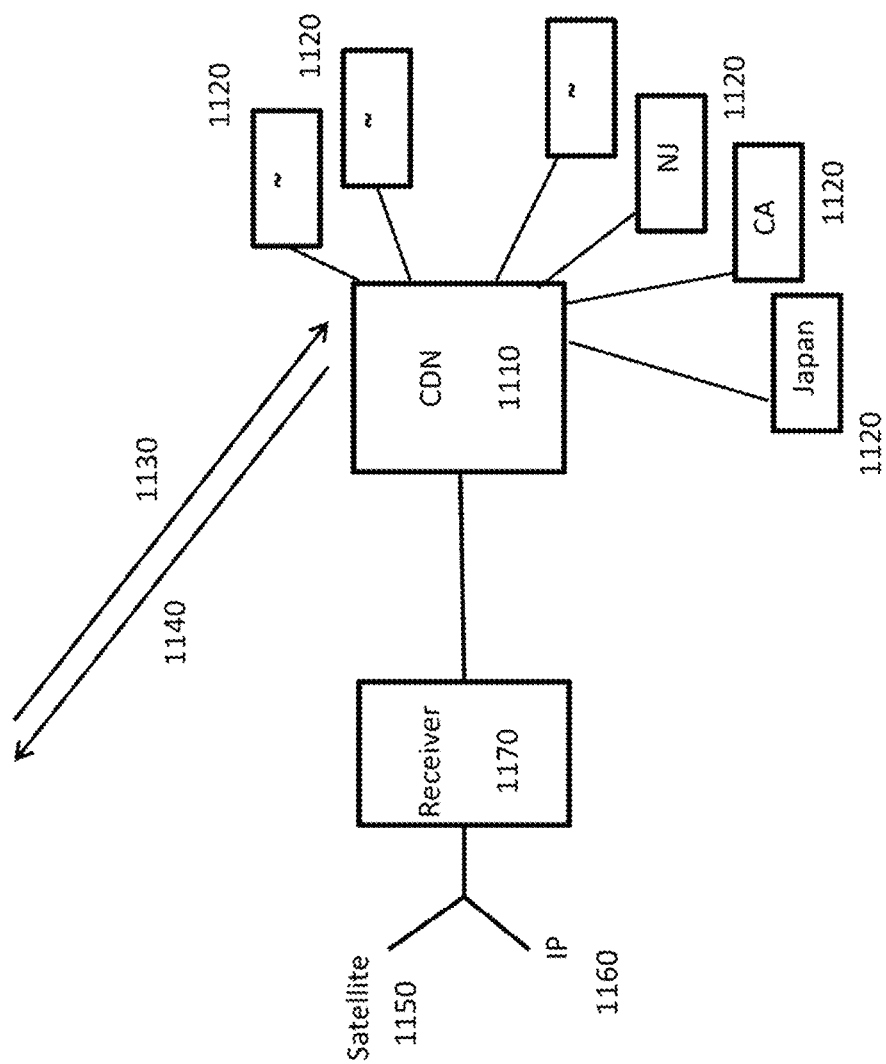
FIG. 11 illustrates a system that includes at least one content delivery network (CDN), in accordance with certain embodiments.

Each user device 1010 may initiate a login, which includes performing each of the communication flows 1040-1090. With regard to communication flow 1040, the user device may provide user authentication information to the customer record database 1030. Next, with communication flow 1050, the customer record database 1030 may provide package information to the user device 1010. The package information may include, for example, information that indicates the type of service package that the user has subscribed to. Next, with communication flow 1060, the user device requests metadata regarding the content that is to be displayed on the user interfaces for the user (where the user interfaces may correspond to the user interfaces shown in FIGS. 1-8). The metadata is sent via communication flow 1070 to the user device 1010 may assist the user interfaces in presenting the correct data for each of the displayed channels upon the user interfaces. Next, with communication flow 1080, the user device may request a channel URL (which may or may not be tokenized) from a Content Delivery Network (CDN) (1010, where the CDN is illustrated in FIG. 11). Finally, with communication flow 1090, the user device may receive the media content from the CDN.

Certain embodiments may utilize multiple CDNs. By utilizing multiple CDNs, certain embodiments may perform active switching between the different CDNs. By performing such active switching, certain embodiments may perform superior live streaming for better streaming availability and reliability. For example, certain embodiments may have the ability to use multiple different CDNs (e.g., an Akamai™ CDN and/or an L-3™ CDN, for example). In addition, the content delivery network (CDN) may alternatively be multiple servers designed to serve video or other content from content publishers to the end users. Note that the CDN may be servers in one location, or may be distributed on a cloud.

FIG. 11 illustrates a system that includes at least one CDN 1110, in accordance with certain embodiments. As described above, once a user connects with a load balancer agent. A load balancer can monitor internet traffic among devices and servers in a system, and manage rules for allocating server resources for the various devices in a system. The load balancer can offload traffic to other servers in a CDN depending upon the specific conditions at that time, such as bandwidth, content streaming quality, and the like. The load balancer communicates with the CDN 1110 via communication flow 1130 and 1140, CDN 1110 may direct the user to one or more edge servers 1120. The CDN 1110 may direct the user device to an edge server based on information with regards to that edge server, such as the geographical location proximity to the user device, communication speed, and quality of video feed. Next, media content may be received by a receiver server 1170 via a satellite source 1150 and/or an internet protocol source 1160, and the media content can then be delivered to the user device via CDN 1110.

Figure 12:
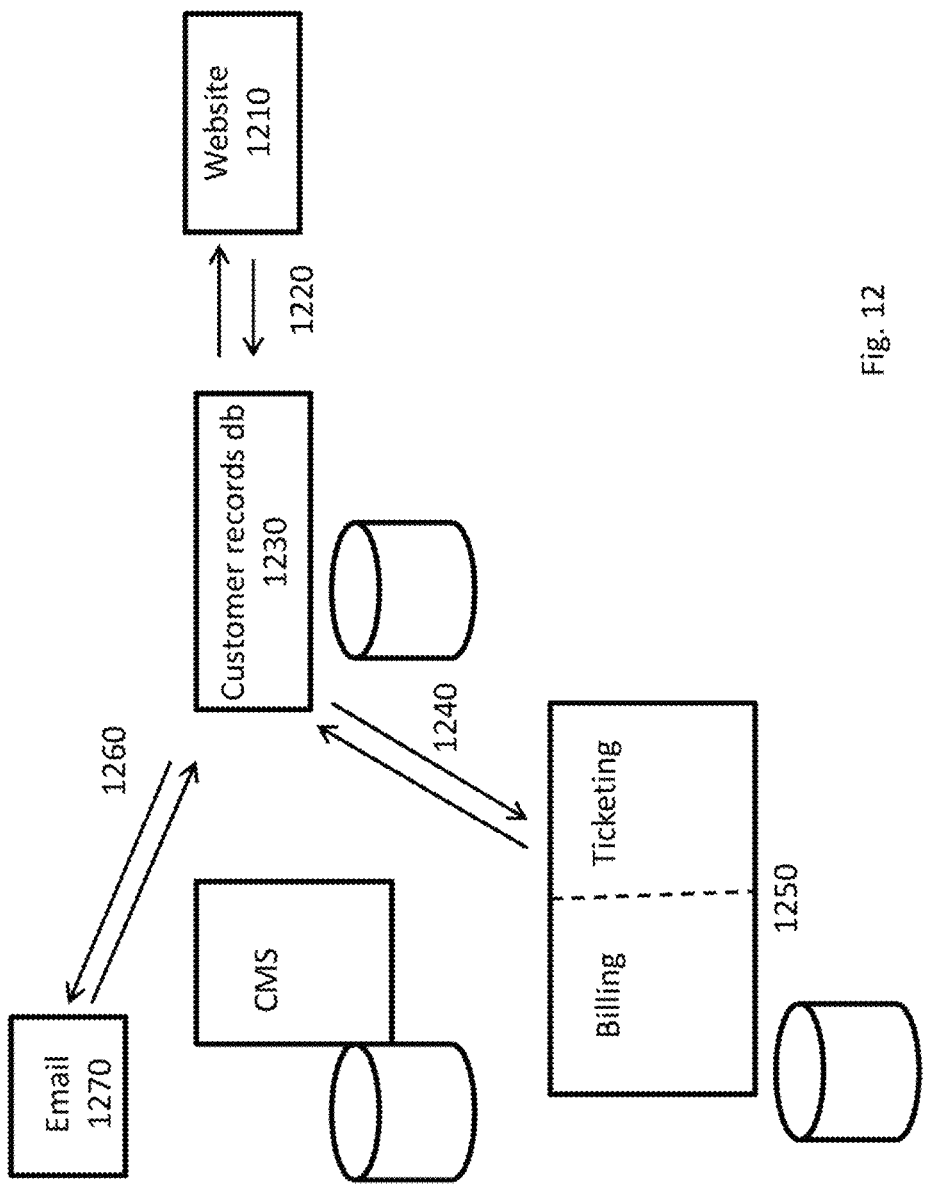
FIG. 12 illustrates a system that can perform the function of signing up a user, in accordance with certain embodiments.

FIG. 12 illustrates a system that can perform the function of signing up a user, in accordance with certain embodiments. With a first communication 1220, a user may access a main web site (1230, corresponding to the service) to sign up for the service. Next, the website 1210 communications with the customer records database 1230, where a record for the new user is recorded in the database. Next, the customer records database 1230 sends information via communication 1240 to the billing system 1250, where a record for the user may be created. The billing system 1250 sends information that the billing record is created to the customer service records database 1230. Next, an account is created 1260 and a verification e-mail 1270 may be sent to the user. Next, the user may review the verification e-mail and respond to the verification e-mail. Finally, creation of the new customer account is completed.

Figure 13:
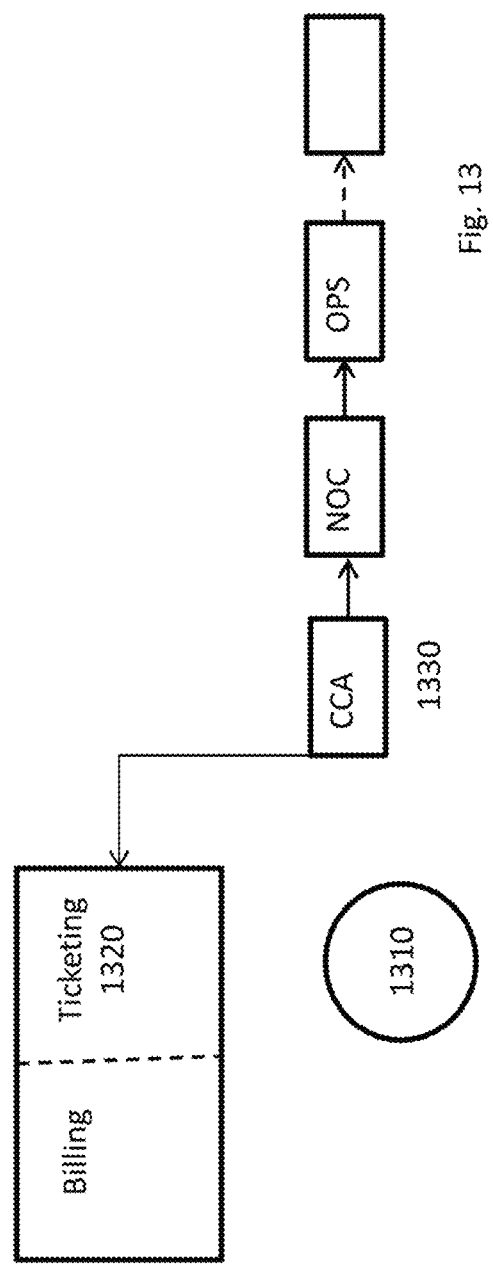
FIG. 13 illustrates a system for addressing a user concern, in accordance with certain embodiments.

FIG. 13 illustrates a system for addressing a user concern, in accordance with certain embodiments. If a user 1310 has a concern/problem, the user 1310 may reach out to either a ticketing system 1320 to create a ticket to address the concern, or the user 1310 may reach out to a customer care agent (CCA) 1330. Once the user 1310 reaches the CCA 1330, CCA 1330 may still create a ticket at ticketing system 1320. In the event that the CCA 1330 is unable to resolve the concerns of the user 1310, the concerns may be forwarded to a network operation center engineer (NOC). In the event that the NOC cannot resolve the concern, then the concern may be forwarded to an operations engineer (OPS). Finally, in the event that the OPS is unable to resolve the concern, then the OPS may forward the concern to a subject matter expert.

Certain embodiments may be directed to a back end that uses multiple Electronic Programming Guide (EPG) metadata. In other words, certain embodiments allow multiple metadata sources to be used for each channel, allowing each channel to utilize the best possible channel programming information.

Certain embodiments may implement an analytics engine to collect and generate statistics regarding the users, while maintaining the anonymity of the users.

Figure 14:
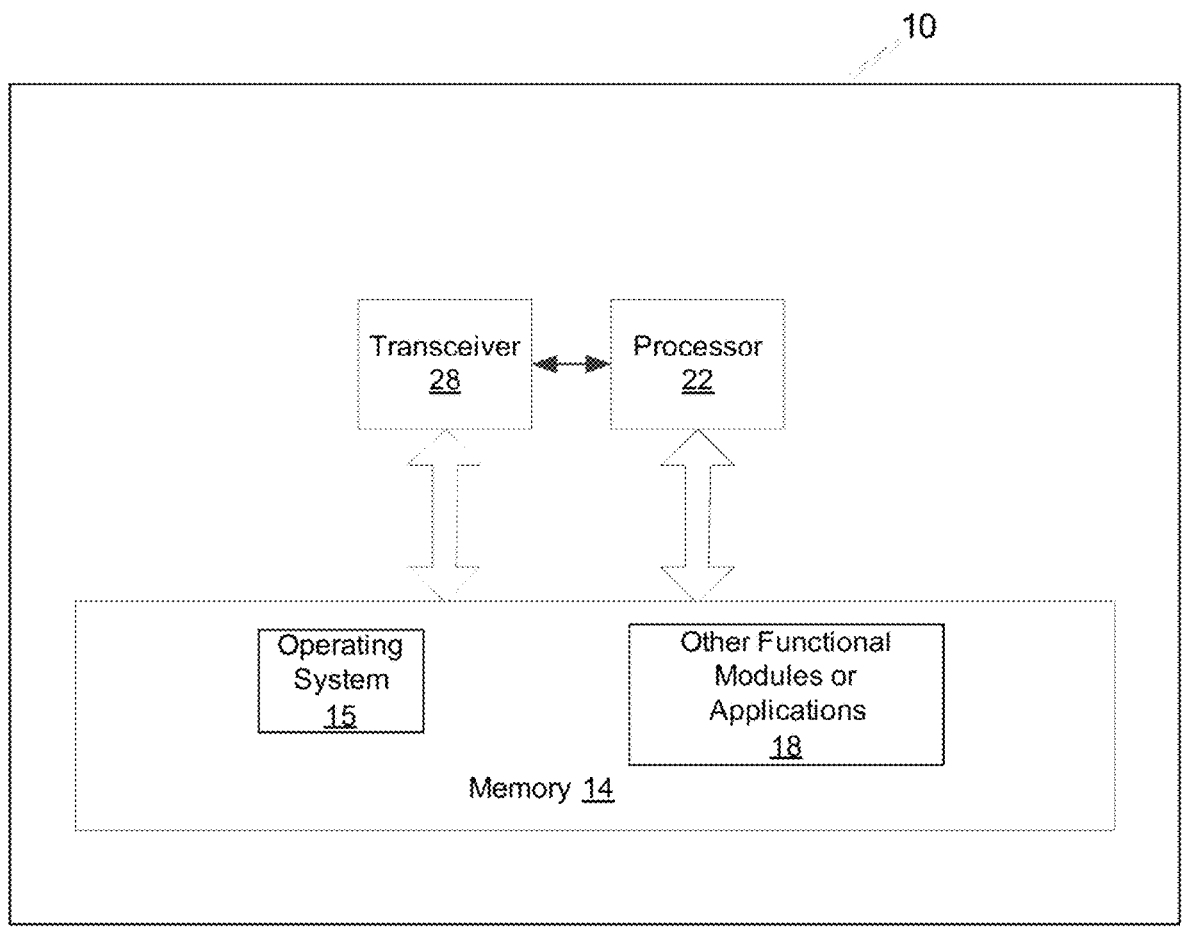
FIG. 14 illustrates an apparatus in accordance with certain embodiments of the invention.
Figure 15:
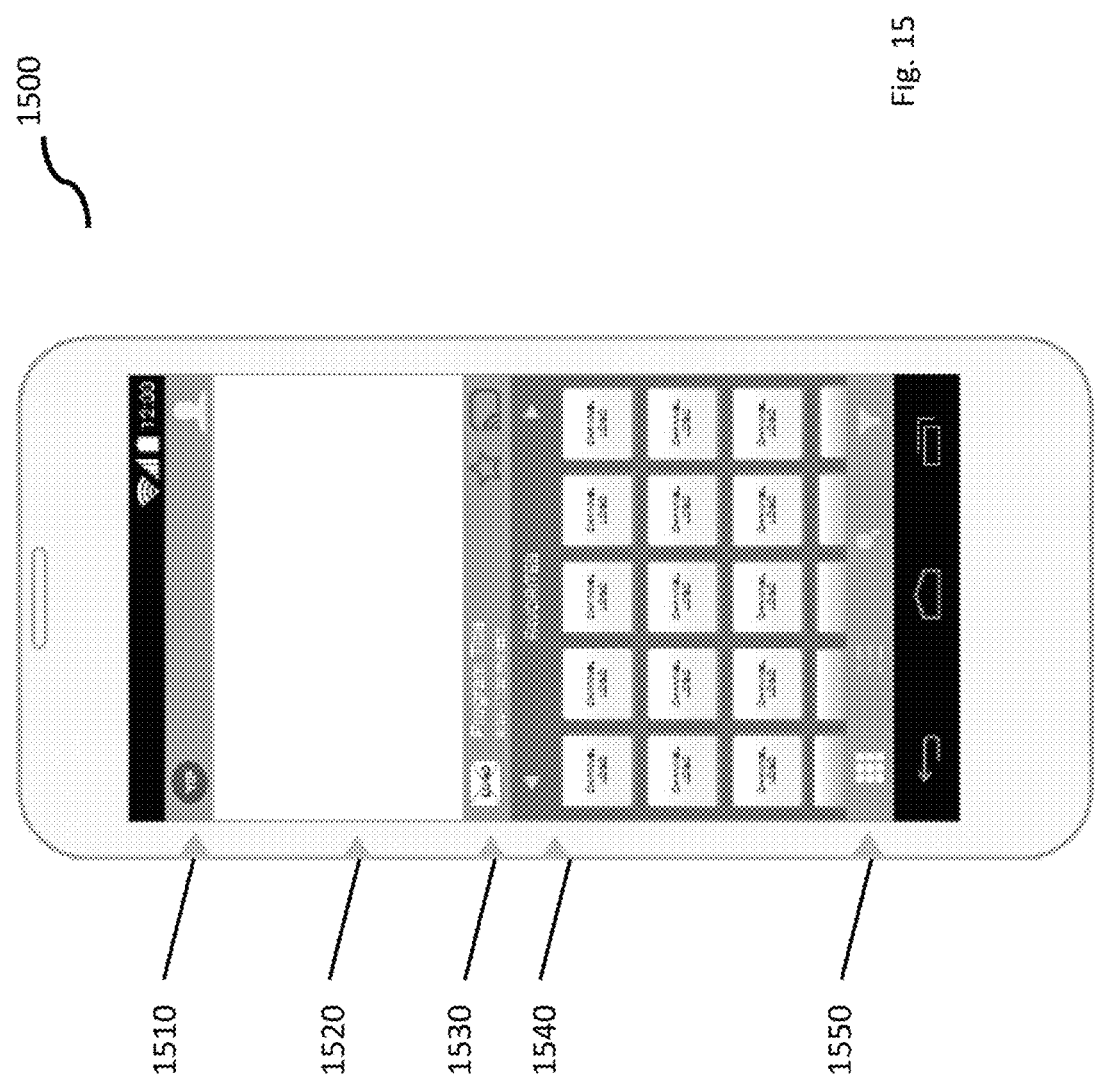
FIG. 15 illustrates a system for addressing CDN balancing in accordance with certain embodiments of the invention.

FIG. 14 illustrates an apparatus in accordance with certain embodiments of the invention. In one embodiment, the apparatus can correspond to content management server, a customer record server, and/or a CDN, for example. Apparatus 10 can include a processor 22 for processing information and executing instructions or operations. Processor 22 can be any type of general or specific purpose processor. While a single processor 22 is shown in FIG. 14, multiple processors can be utilized according to other embodiments. Processor 22 can also include one or more general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

The claimed invention also has numerous variations to accommodate customers. For instance, in one embodiment, the user device can stream the video content directly to a larger screen such as a computer screen, tablet, or TV via chromecast, cables (HDMI cable, displayport cable, and the like), wireless communication (Bluetooth, appletv, wifi).

In one embodiment, the user device 1500 logged into the account displays a user interface that includes a header bar 1510 that may display account access and possible alerts or messages. The user interface also contains at least one video content 1520 that plays the video, a playing now bar 1530 that may show the current channel, program, time and the like. The bar 1530 may also allow a user to toggle the channel or show as a favorite for the user. The user interface may also contain a content browser 1540 that illustrates channels and shows, where the user may search for content, rearrange the channels or shows. The content browser may display icon displays for live content, reminder icons for programs which air in the future, set reminders (10 minute reminder for a show), and show names and channel icon that change to that channel and play current live program. Here the user can swipe up, down, left and right to change the panel or see more content. The content bar 1550 may also show information such as channels, shows, search function icon and filter icon. Other variations of the content bar 1550 include an icon for DVR (recording show(s)) functionality.

In one embodiment, a user may add a reminder to a user calendar (including but not limited to Microsoft outlook, Google calendar, Apple calendar and the like) to watch a certain show. In this embodiment, upon locating a show of interest where the program airs in the future, the user may engage the set reminder icon. The reminder parameters (time in advance for reminder, method of reminder, and the like) may be set by the user. Engaging the set reminder icon may also result in a native dialogue pop up on the user interface, requesting access to the calendar to add a reminder on the calendar of the program viewing time.

Figure 16:
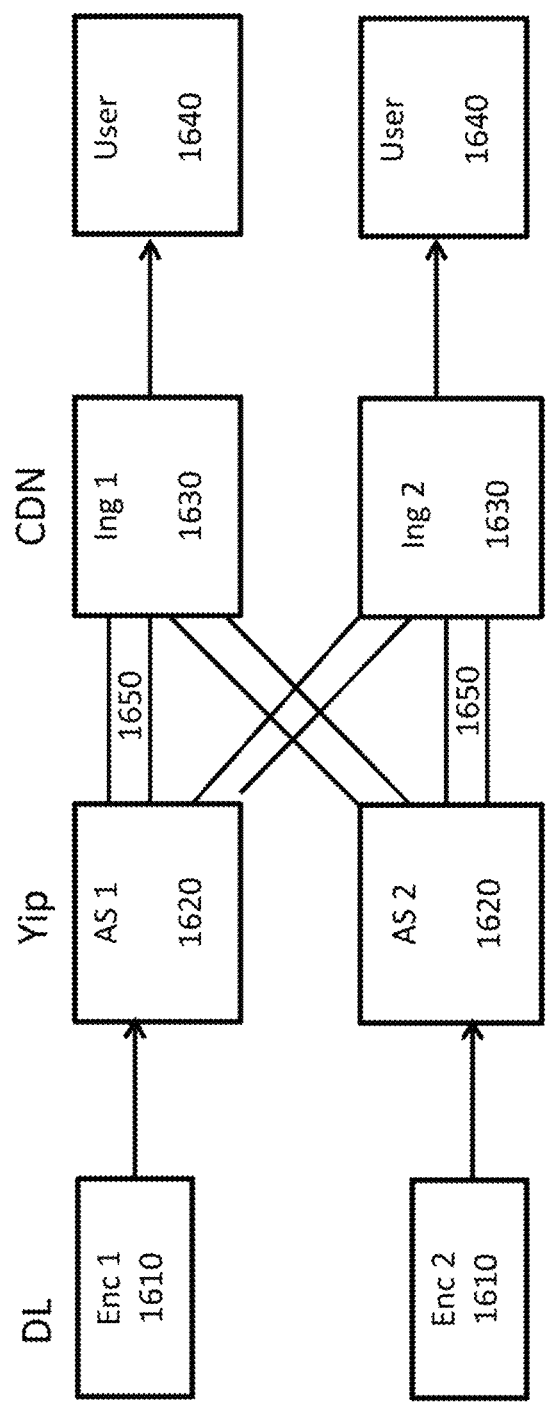
FIG. 16 illustrates a system for addressing CDN balancing in accordance with certain embodiments of the invention.

FIG. 16 illustrates one embodiment of the invention illustrating CDN balancing by use of redundant encoders. Both encoders 1610 (Enc 1 and Enc 2) receives content from a satellite or IP address, and encodes it as necessary to send the content to the CDN, for instance encoding from analog to digital. The encoded content is sent to AS1 and AS2 1620 (anchor servers) which both communicate with Ing 1 and Ing2 1630 (ingestion point) which communicate with the CDN. The CDN then directs the user device to an edge server based on information with regards to that edge server, such as the geographical location proximity to the user device, communication speed, and quality of video feed. If one encoder 1610 or anchor server 1620 goes down, or perhaps if a CDN 1 goes down, then the content will continue to be communicated to the user device by routing through the other CDN 1640.

Figure 17:
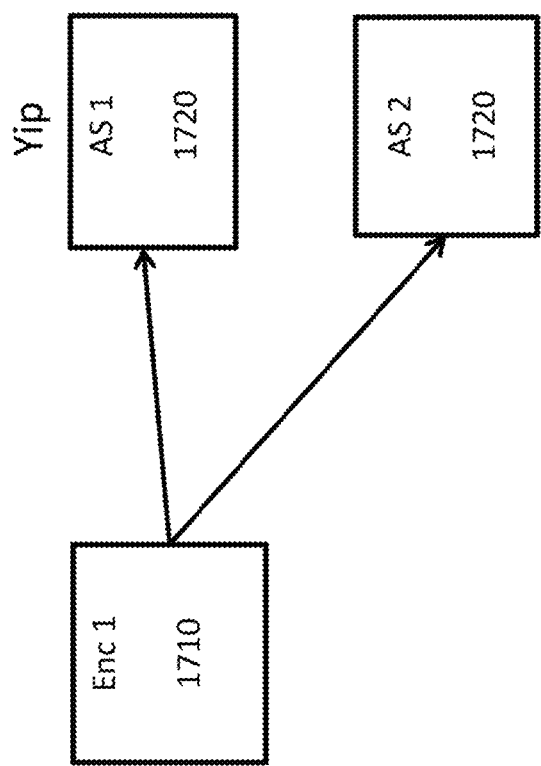
FIG. 17 illustrates a system for addressing CDN balancing in accordance with certain embodiments of the invention.

FIG. 17 illustrates one embodiment of the invention illustrating CDN balancing, and illustrates how one encoder 1710 can communicate with two anchor servers AS1 and AS2 1620. In this embodiment, if one AS1 1620 is down, then the Enc1 17190 will reroute the content to AS2 1720.

Figure 18:
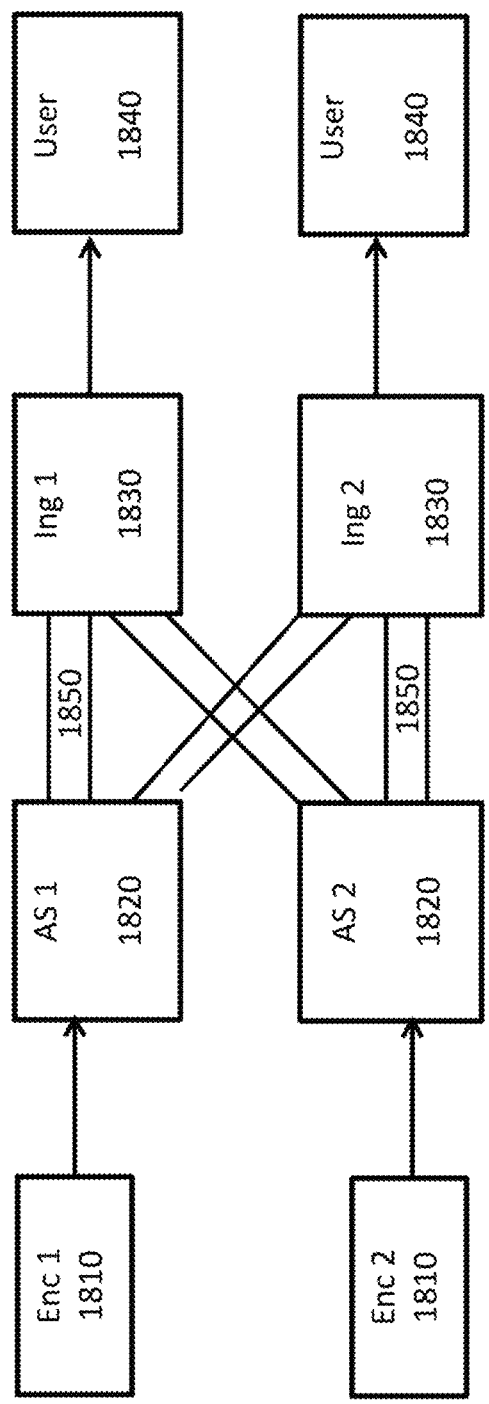
FIG. 18 illustrates a system for addressing CDN balancing in accordance with certain embodiments of the invention.

FIG. 18 illustrates one embodiment of the invention illustrating CDN balancing by use of fully redundant encoders, anchor servers and CDN.

FIG. 19 illustrates one embodiment of the invention illustrating a method and system for CDN balancing. The encoders (Enc 1, Enc 2, Enc 3, Enc 4) 1910 are each capable of sending more than one bit rate for a channel to a given anchor server (AS1, AS 2, AS3, AS4, AS5) 1920. There may be up to 3 or 4 screens coming from the encoder, each with a different quality, i.e., bit rate. For HD channel, the encoder is capable of sending, for instance, 4 channels from the encoder to anchor server, denoted by communication 1, 2, 3 and 4 in the FIG. 19. The AS server determines which ING point to send the content to, e.g., Primary ING 1930 or Secondary ING 1940. The protocol takes the bandwidth for the user, i.e., if there is an issue with the bandwidth between the CDN and the user device, which can affect the content viewing. The edge server sends all screens for a given channel to a primary engine. The anchor server can optionally send the same screens to the secondary engine. If the CDN fails, then the secondary engine can take over.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A system for managing content of at least one content delivery network server (CDN), the system comprising:
    at least one processor; and
    at least one memory including computer program code, wherein the at least one memory and the computer program code are configured to, with the at least one processor, cause the system to:
    send a plurality of channel content to a plurality of anchor servers, wherein the plurality of channel content have at least four streams each with a different bit rate;
    determine that an ingestion server should receive the plurality of channel content;
    determine that each of a plurality of user devices has internet bandwidth for the plurality of channel content with at least one of the different bit rates;
    instruct a first CDN to perform an action so that the plurality of user devices receive the plurality of channel content; and
    determine whether a first CDN has failed to perform the action, and if the first CDN failed to perform the action, then instruct a second CDN to take over and perform the action of the first CDN so that the plurality of user devices receive the plurality of channel content.

2. The system according to claim 1, wherein the at least one memory and the computer program code are further configured to, with the at least one processor, cause the system to provide a customizable interface that reports different measurements relating to a user's viewing experience on the plurality of user devices.

3. The system according to claim 2, wherein the measurements comprise utilized bandwidth, utilized resources, or other usage reporting and statistics related to a user's viewing session.

4. The system according to claim 1, wherein the at least one memory and the computer program code are further configured to, with the at least one processor, cause the system to
    check a number of active sessions across different user devices that are receiving the plurality of channel content to determine if the number of active sessions exceeds a threshold amount,
    limit the number of active sessions across different user devices receiving the plurality of channel content,
    delete a previously active session that is an oldest active session, in order to activate a new active session, and
    add a new active session after deleting the previously active session.

5. The system according to claim 1, wherein either the first CDN or the second CDN is configured to send a uniform resource locator (URL) corresponding to the plurality of channel content to the plurality of user devices.

6. The system according to claim 5, wherein the URL is tokenized.

7. A computer program for managing content of at least one content delivery network server (CDN), embodied on a non-transitory computer readable medium, the computer program, when executed by a processor, causes the processor to:

send a plurality of channel content to a plurality of anchor servers, wherein the plurality of channel content have at least four streams each with a different bit rate;

determine that an ingestion server should receive the plurality of channel content;

determine that each of a plurality of user devices has internet bandwidth for the plurality of channel content with at least one of the different bit rates;

instruct a first CDN to perform an action so that the plurality of user devices receive the plurality of channel content; and determine whether a first CDN has failed to perform the action, and if the first CDN failed to perform the action, then instruct a second CDN to take over and perform the action of the first CDN so that the plurality of user devices receive the plurality of channel content.

8. The computer program according to claim 7, when executed by the processor, further causes the processor to provide a customizable interface that reports different measurements relating to a user's viewing experience on the plurality of user devices.

9. The computer program according to claim 8, wherein the measurements comprise utilized bandwidth, utilized resources, or other usage reporting and statistics related to a user's viewing session.

10. The computer program according to claim 7, when executed by the processor, further causes the processor to check a number of active sessions across different user devices that are receiving the plurality of channel content to determine if the number of active sessions exceeds a threshold amount, limit the number of active sessions across different user devices receiving the plurality of channel content, delete a previously active session that is an oldest active session, in order to activate a new active session, and add a new active session after deleting the previously active session.

11. The computer program according to claim 7, wherein either the first CDN or the second CDN is configured to send a uniform resource locator (URL) corresponding to the plurality of channel content to the plurality of user devices.

12. The computer program according to claim 11, wherein the URL is tokenized.

13. A method for managing content of at least one content delivery network server (CDN), comprising:

sending a plurality of channel content to a plurality of anchor servers, wherein the plurality of channel content have at least four streams each with a different bit rate;

determining that an ingestion server should receive the plurality of channel content;

determining that each of a plurality of user devices has internet bandwidth for the plurality of channel content with at least one of the different bit rates;

instructing a first CDN to perform an action so that the plurality of user devices receive the plurality of channel content; and determining whether a first CDN has failed to perform the action, and if the first CDN failed to perform the action, then instruct a second CDN to take over and perform the action of the first CDN so that the plurality of user devices receive the plurality of channel content.

14. The method according to claim 13, further comprising providing a customizable interface that reports different measurements relating to a user's viewing experience on the plurality of user devices.

15. The method according to claim 14, wherein the measurements comprise utilized bandwidth, utilized resources, or other usage reporting and statistics related to a user's viewing session.

16. The method according to claim 13, wherein the method further comprises:

check a number of active sessions across different user devices that are receiving the plurality of channel content to determine if the number of active sessions exceeds a threshold amount, limiting the number of active sessions across different user devices receiving the plurality of channel content, deleting a previously active session that is an oldest active session, in order to activate a new active session, and adding a new active session after deleting the previously active session.

17. The method according to claim 13, wherein either the first CDN or the second CDN is configured to send a uniform resource locator (URL) corresponding to the plurality of channel content to the plurality of user devices.

18. The method according to claim 17, wherein the URL is tokenized.

* * * * *